(12) United States Patent
Grayson et al.

(10) Patent No.: US 8,359,346 B2
(45) Date of Patent: Jan. 22, 2013

(54) HASH FUNCTION FOR HARDWARE IMPLEMENTATIONS

(75) Inventors: Brian C. Grayson, Austin, TX (US); Leick D. Robinson, Round Rock, TX (US); Benjamin M. Menchaca, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 748 days.

(21) Appl. No.: 12/612,757

(22) Filed: Nov. 5, 2009

(65) Prior Publication Data

US 2011/0106866 A1    May 5, 2011

(51) Int. Cl.
 *G06F 7/00* (2006.01)
(52) U.S. Cl. ........................................................ 708/200
(58) Field of Classification Search ........................ None
See application file for complete search history.

(56) References Cited

U.S. PATENT DOCUMENTS

| | | | | |
|---|---|---|---|---|
| 5,754,819 A | * | 5/1998 | Lynch et al. | 711/218 |
| 2005/0244000 A1 | * | 11/2005 | Coleman | 380/44 |
| 2007/0172053 A1 | * | 7/2007 | Poirier | 380/28 |
| 2008/0222387 A1 | * | 9/2008 | Williamson et al. | 711/216 |

* cited by examiner

*Primary Examiner* — Ilwoo Park
(74) *Attorney, Agent, or Firm* — Van Leeuwen & Van Leeuwen; David Dolezal

(57) ABSTRACT

A logic block is presented that generates avalanche criterion hash values using minimal logic. The logic block includes a first exclusive-OR function, a second exclusive-OR function, and an OR function. The first exclusive-OR function receives two input bits from a data packet and generates a linear output value based upon exclusive disjunction between the two input bits. The OR function receives two different input bits from the data packet and generates a first nonlinear output value based upon logical disjunction between the two different input bits. The second exclusive-OR function receives the linear output value and the first nonlinear output value, and generates a second nonlinear output value based upon exclusive disjunction between the linear output value and the first nonlinear output value. In turn, the second nonlinear output value is utilized to generate a hash value for the data packet.

20 Claims, 10 Drawing Sheets

| OR Gate Logic Table ||| |
|---|---|---|---|
| Inputs || Output ||
| 0 | 0 | 0 | ← Output Change |
| 0 | 1 | 1 | ← No Output Change |
| 1 | 1 | 1 | ← No Output Change |
| 1 | 0 | 1 | |

Table 400

410 — Input
420 — Input
430 — Output
450, 460, 470, 480 — rows

*FIG. 4*

| n = | Input n Value | (i=3) Input n+i Value | (j=5) Input n+j Value | k=8 Input n+k Value |
|---|---|---|---|---|
| 0 | bit location location 0 value | bit location location 3 value | bit location location 5 value | bit location location 8 value |
| 1 | bit location 1 value | bit location 4 value | bit location 6 value | bit location 9 value |
| 2 | bit location 2 value | bit location 5 value | bit location 7 value | bit location 10 value |
| 3 | bit location 3 value | bit location 6 value | bit location 8 value | bit location 11 value |
| 4 | bit location 4 value | bit location 7 value | bit location 9 value | bit location 12 value |
| 5 | bit location 5 value | bit location 8 value | bit location 10 value | bit location 13 value |
| 6 | bit location 6 value | bit location 9 value | bit location 11 value | bit location 14 value |
| 7 | bit location 7 value | bit location 10 value | bit location 12 value | bit location 15 value |
| 8 | bit location 8 value | bit location 11 value | bit location 13 value | preset value |
| 9 | bit location 9 value | bit location 12 value | bit location 14 value | preset value |
| 10 | bit location 10 value | bit location 13 value | bit location 15 value | preset value |
| 11 | bit location 11 value | bit location 14 value | preset value | preset value |
| 12 | bit location 12 value | bit location 15 value | preset value | preset value |
| 13 | bit location 13 value | preset value | preset value | preset value |
| 14 | bit location 14 value | preset value | preset value | preset value |
| 15 | bit location 15 value | preset value | preset value | preset value |

HASH FUNCTION FOR HARDWARE IMPLEMENTATIONS

TECHNICAL FIELD

The present invention relates to an improved avalanche criterion hash function. More particularly, the present invention relates to a hash function that provides strict avalanche criterion hash values.

BACKGROUND

A hash function is a well-defined procedure or mathematical function for turning data into a relatively small integer value (referred to as a hash value), which is typically distributed across a range known as a hash range. In network traffic applications, for example, a hash function may generate a hash value for each incoming data packet for use in load balancing. In turn, the incoming data packets are grouped and processed according to their corresponding hash value.

BRIEF DESCRIPTION OF THE DRAWINGS

The present invention may be better understood, and its numerous objects, features, and advantages made apparent to those skilled in the art by referencing the accompanying drawings, wherein:

FIG. 4 is a table showing an example of nonlinear properties of an OR function;

FIG. 9 is a table showing an example of bit locations for which to retrieve input values from a bit segment.

DETAILED DESCRIPTION

Figure 1:
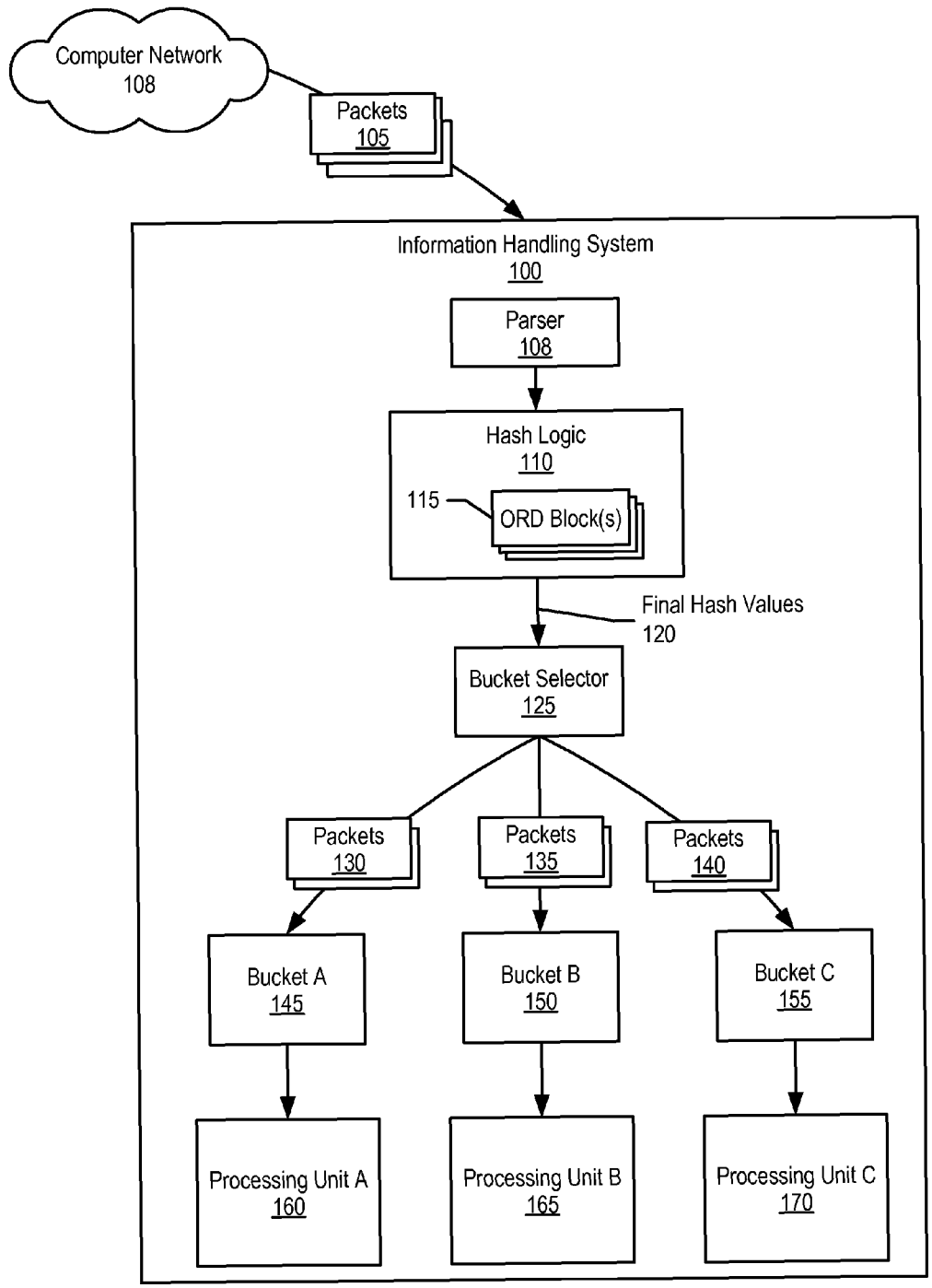
FIG. 1 is a diagram example showing a computer system using hash logic to generate strict avalanche criterion hash values for incoming data packets.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram example showing an information handling system using hash logic to generate strict avalanche criterion hash values for incoming data packets. Information handling system 100 (e.g., a computer system, communication system, etc.) receives packets 105 from computer network 108, and uses hash logic 110 to compute a hash value (included in final hash values 120) for each of packets 105, such as for network load balancing, order preservation/restoration tracking, exclusive access, or fast lookup. "Logic" described herein may be implemented in hardware, software, or a combination of both hardware and software. For example, hash logic 110 may be a hardware-based implementation (e.g., logic gates) for increased throughput; a software-based implementation for configurability purposes; or a combination of hardware and software modules.

Information handling system 100 parses one of packets 105 into bit segments using parser 108. Hash logic 110, in turn, iteratively processes the packet's bit segments during the generation of a hash value for the parsed packet. For example, one of packets 105 may include 128 bits, which information handling system 100 may parse into eight 16-bit segments and, in turn, iteratively process the eight 16-bit segments. The way in which information handling system 100 parses packets 105 may depend upon resource trade-offs, such as an amount of silicon space that information handling system 100 dedicates to hash logic 110 (hardware-based implementation). For example, hash logic 110 may be large enough to process 64 bits in parallel, in which case information handling system 100 is able to parse each of packets 105 into 64-bit segments. In one embodiment, instead of receiving individual packets 105, information handling system 100 receives an input data stream, which information handling system 100 parses into bit segments.

Hash logic 110 uses combinatorial logic and mixing logic (ORD logic blocks 115) to generate hash values that are deterministic, uniformly distributed, have a low correlation between input values and output values, and meet a strict "avalanche criterion." The avalanche criterion pertains to a hash function's ability to randomly distribute hash values over a given hash range. For example, when an input value changes slightly (e.g., flipping a single bit), the output changes significantly (e.g., half the output bits flip). A weak avalanche criterion hash function changes half the output bits when an input bit changes. A strict avalanche criterion hash function provides a 50% likelihood that any specific output bit will change when any specific input bit changes. The stricter a hash function's criterion, the better the hash function.

Figure 3:
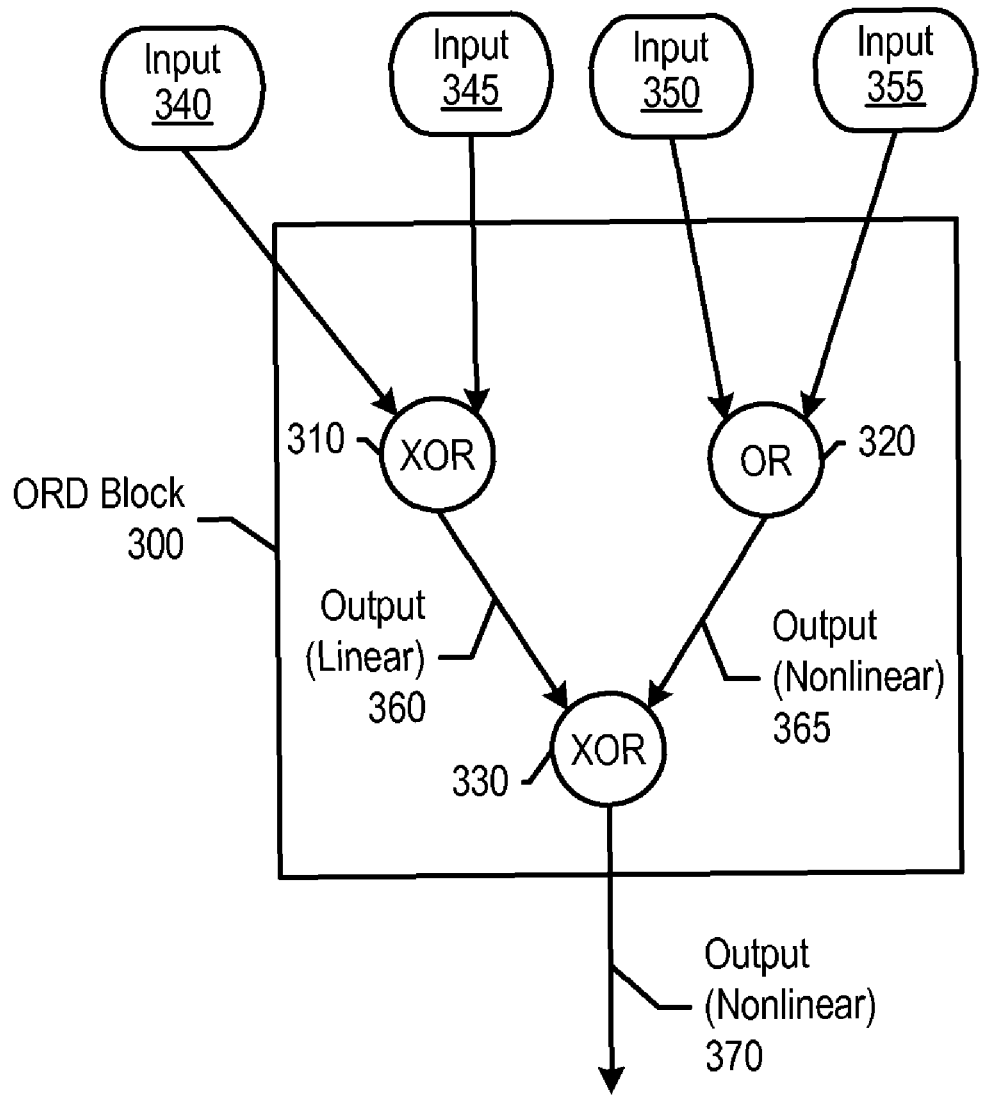
FIG. 3 is a diagram example of an ORD logic block that provides nonlinear output value changes based upon input value changes.

Each of ORD logic blocks 115 include two exclusive-OR functions and one OR function (see FIG. 3 and corresponding text for further details). ORD logic blocks 115 provide strict avalanche criterion characteristics by using a nonlinear function (OR function) to determine whether to change the output of a linear function (XOR function). In one embodiment, hash logic 110 includes an ORD logic block 115 for each bit location of a bit segment (single stage mixer). For example, a packet may include 128 bits, which information handling system 100 parses into eight 16-bit segments. In this example, hash logic 110 includes sixteen ORD logic blocks 115, one for each bit location. In another embodiment, hash logic 110 may comprise multiple mixing stages for increased robustness. Using the example above, hash logic 110 may include two mixing stages, thereby having 32 ORD logic blocks 115 (16 blocks for the first stage and 16 blocks for the second stage, see FIG. 6 and corresponding text for further details).

Hash logic 110 iteratively computes a hash value for each of packets 105 based upon how many bit segments are parsed from a packet. For example, assuming a packet is parsed into eight segments, hash logic 110 generates an interim hash value for the first bit segment that feeds back into combination logic, which combines the interim hash value with bits from the second bit segment. The combined bits are then fed back into ORD logic blocks 115, which generate a second interim hash value. This iteration continues until the last bit segment (eighth bit segment) is processed, at which point the interim hash value becomes the final hash value (final hash value 120) for the packet (see FIG. 2 and corresponding text for further details).

Hash logic 110 provides hash values 120 to bucket selector 125, which separates and stores each of packets 120 (separated out as packets 130-140) in one of buckets 145-155 (e.g., temporary storage areas such as computer memory) based upon their corresponding hash value. For example, bucket selector 125 may store packets 130 that have a corresponding hash value between 0000-5000 in bucket A 145; store packets 135 that have a corresponding hash value between 5001-A000 in bucket B 150; and store packets 140 that have a corresponding hash value between A001-FFFF in bucket C 155. Bucket selector 125, for example, may be a software subroutine, hardware logic, or a combination of software functions and hardware functions. Once packets are stored in their corresponding buckets, one of processing units 160-170 processes the packets accordingly.

As one skilled in the art can appreciate, although FIG. 1 shows a one-to-one relationship between buckets 145-155 and processing units 160-170, other embodiments exists such as a many-to-many relationship. For example, bucket selector 125 may separate and store packets 120 into 1024 buckets and, in this example, each core of a 4-core processor may process packets stored in 256 of the buckets.

Figure 2:
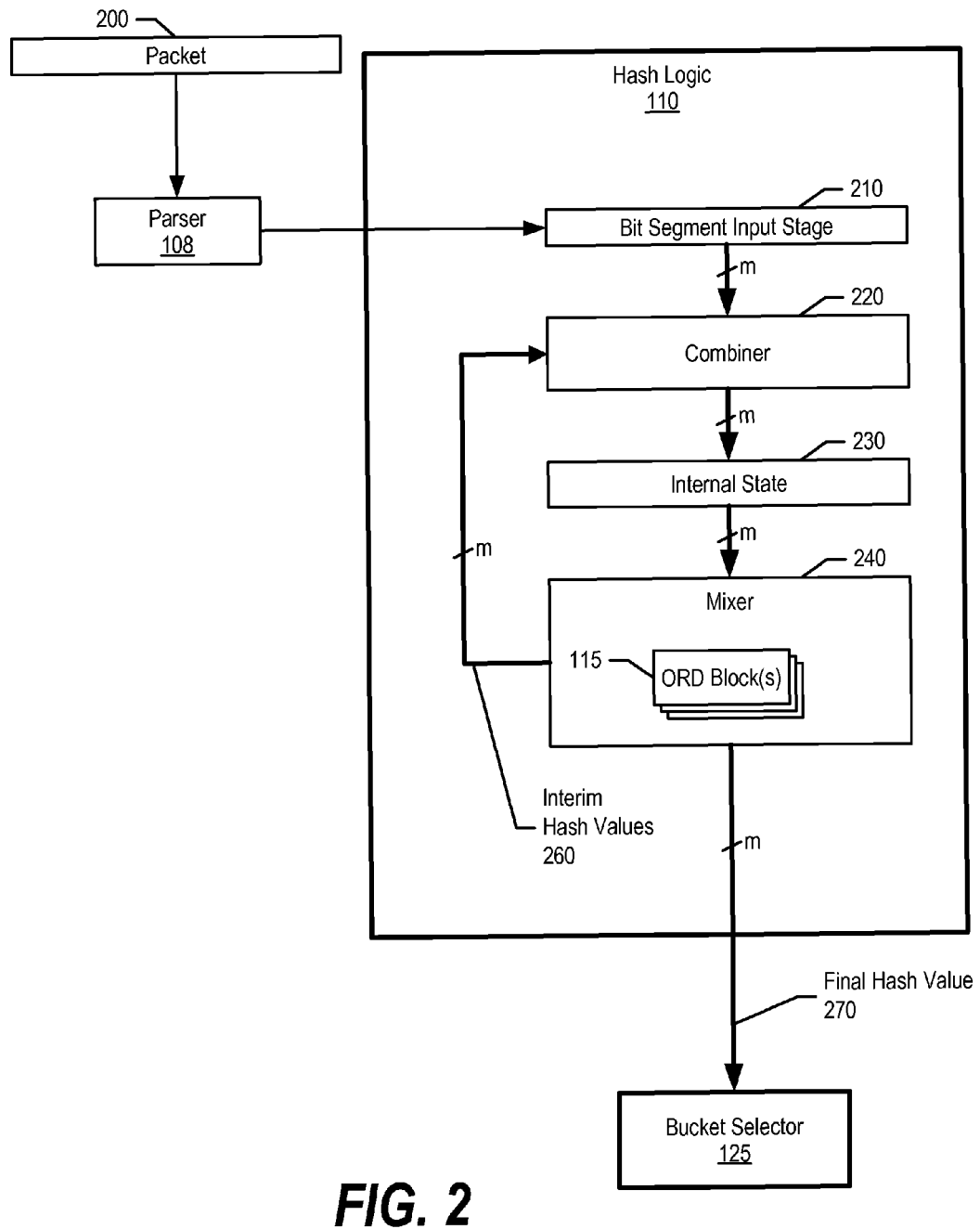
FIG. 2 is a diagram example of hash logic generating a hash value for a data packet using nonlinear ORD logic blocks.

FIG. 2 is a diagram example of hash logic generating a hash value for a data packet using nonlinear ORD logic blocks. Each of ORD logic blocks 115 include a nonlinear function that determines whether to change the output value of a linear function, thus providing nonlinear output values while also providing output value balancing between the number of times a "0" is output versus the number of times a "1" is output.

Parser 108 parses packet 200 into bit segments according to the size of bit segment input stage 210 ("m" number of bits). For example, bit segment input stage 210 may include 256 registers and packet 200 may include 1024 bits. In this example, parser 108 parses the 1024 bits into four 256-bit segments. Hash logic 110 receives one of the bit segments from parser 108 and stores the bit segment into bit segment input stage 210 (e.g., temporary memory, registers, etc.). Bit segment input stage 210 feeds the bits into combiner 220, which combines the inputs with interim hash values 260 from mixer 240, which may be reset to zero for the first bit segment combination. In one embodiment, combiner 220 may perform a one-to-one location combination, such as combining bit segment input stage 210's bit 0 with interim hash values 260's bit 0, bit 1 with bit 1, bit 2 with bit 2, etcetera. In another embodiment, combiner 220 may perform a cross-location combination, such as combining bit segment input stage 210's bit 0 with interim hash values 260's bit 15. Combiner 220 provides values to internal state 230, which is a temporary storage area for mixer 240 to receive input values.

Mixer 240 includes nonlinear ORD logic blocks 115 for mixing internal state 230's stored values and generating hash values that exhibit strict avalanche criterion characteristics. In one embodiment, mixer 240 includes an ORD logic block for each bit location within bit segment input stage 210, such as sixteen ORD logic blocks for sixteen bit segment bit locations (see FIG. 5 and corresponding text for further details). In another embodiment, to produce more robust hash values, mixer 240 includes multiple stages of ORD logic blocks for each bit location within bit segment input stage 210 (see FIG. 6 and corresponding text for further details).

Hash logic 110 iteratively processes packet 200 by processing segments of packet 200 and feeding interim hash values 260 back to combiner 220 until each of packet 200's bits are processed. Once hash logic 110 processes the last segment of packet 200, hash logic 110 provides mixer 240's output as final hash value 270 to bucket selector 125, which is a final hash value for packet 200. In turn, bucket selector 125 stores packet 200 in a corresponding bucket, based upon final hash value 270, for subsequent processing.

FIG. 3 is a diagram example of an ORD logic block that provides nonlinear output value changes based upon input value changes. ORD logic block 300 includes exclusive-OR (XOR) function 310, OR function 320, and XOR function 330. A "logic block" described herein may be implemented in hardware, software, or a combination of both hardware and software. In one embodiment, to maximize throughput and minimize silicon space, each of functions 310-330 may be simple hardware logic gates, such as XOR gates and an OR gate. In another embodiment, functions 310-330 may be implemented using other functional equivalent approaches. For example, as one skilled in the art can appreciate, XOR function 310 may be implemented using two inverters each coupled to an input of two separate AND gates, whose outputs are fed into an OR gate. In yet another embodiment, to maximize flexibility, functions 310-330 may be implemented in software.

XOR 310 exhibits linear value change propagation properties. Meaning, every time the value of input 340 or 345 changes, the value of output 360 changes. In one embodiment, XOR 310 may be considered a conditional NOT gate. In this embodiment, input 340 may be a control signal and input 345 may be a data input. When control input 340 is a 1, then output 360's value is opposite of data input 345. When control input 340 is a 0, then output 360's value is the same as data input 345. In other words, XOR 310 may be a pass-through function with respect to changes on the data input, whether the control is 0 or 1, and any changes on the data input are 100% propagated to changes in the output. Therefore, XOR 310 is linear with respect to changes on its data input relative to changes on its output, regardless of the control input. As such, XOR 310 generates an output value based upon exclusive disjunction between its inputs (generates a value of true only in cases where the values of its inputs are different).

OR function 320, however, exhibits nonlinear change propagation properties due to the fact that output 365 does not change in value every time input 350 or input 355 changes value (see FIG. 4 and corresponding text for further details). In an embodiment similar to one discussed above, input 350 may be a control signal and input 355 may be a data signal. When control input 350 is low, input 355 data value changes are propagated to output 365. However, when control input 350 is high, input 355 data value changes are not propagate to output 365 because output 365 remains high. In turn, OR function 320 is nonlinear because changes in input values do not always result in changes in output value (e.g., a conditional change-propagator).

OR function 320's nonlinear output 365 feeds into XOR 330, resulting in XOR 330 producing a nonlinear output (output 370) that is utilized to represent inputs 340-355. As such, due to its nonlinear nature, ORD logic block 300 provides strict avalanche criterion hash values using a hardware-friendly implementation. In turn, ORD logic block 300's output may produce an output value within one hardware clock cycle of receiving changes to its input values.

FIG. 4 is a table showing an example of nonlinear properties of an OR function (e.g., OR gate). Table 400 includes input columns 410-420 and output column 430. As one skilled in the art can appreciate, an OR gate is a logical gate that produces an output that is based upon logical disjunction between its inputs (i.e. generates a value of false if both of its input values are false).

Table 400 shows that when a first input is low and a second input changes state (row 450 to row 460, or row 460 to row 450), the output also changes state (column 430), thus exhibiting linear change propagation properties.

However, when the second input is high and the first input changes state (row 460 to row 470, or row 470 to row 460), the output remains the same, thus exhibiting nonlinear change propagation properties. Likewise, when the first input is high and the second input changes state (row 470 to row 480, or row 480 to row 470), the output remains the same, thus again exhibiting nonlinear change propagation properties. As a result, an OR function produces nonlinear results due to the fact that some input changes produce an output change, while other input changes do not produce an output change.

Figure 5:
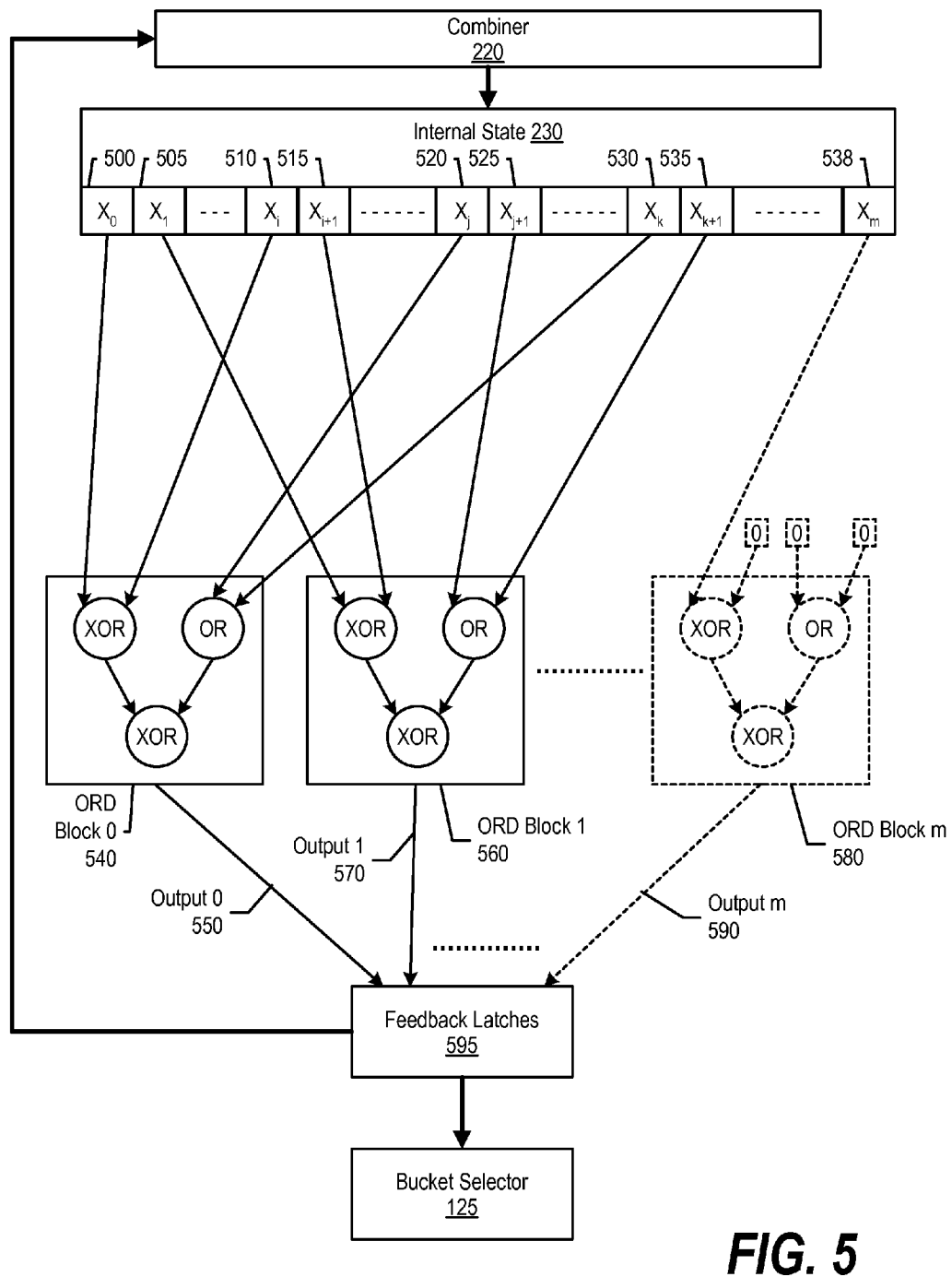
FIG. 5 is a diagram example showing ORD logic blocks generating outputs based upon corresponding bit locations and offset bit locations.

FIG. 5 is a diagram example showing ORD logic blocks receiving bits from corresponding bit locations and offset bit locations. Internal state 230 is the same as that shown in FIG. 2, and stores bits (bits 500-538) received from combiner 220. Internal state 230 includes "m" number of bit locations, which may be the same amount of bit locations included in bit segment stage 210.

Each of ORD logic blocks 540-580 receives input values from internal state 230's bit locations $X_n$, $X_{i+n}$, $X_{j+n}$, $X_{k+n}$, where n ranges from 0 to m. Offset values i, j, and k may have properties, such as prime numbers or other properties that make i, j, and k relatively additively non-congruent, in order to generate robust hash values. Each of the offset values are added to n (internal state bit location) to derive offset bit locations. For example, if i=3, j=5, and k=7, when n=0, processing retrieves bits from bit locations $X_0$, $X_3$, $X_5$, and $X_7$ (see FIG. 9 and corresponding text for further details). In one embodiment, i, j, and k may all have negative values.

ORD logic block 0 540 (n=0) generates output 0 550 from internal state 230's bits $X_o$, $X_i$, $X_j$, and $X_k$. Output 0 550 feeds into feedback latches 595, which feeds back output 0 550 to combiner 220 as bit 0 of an interim hash value (interim hash value 260 in FIG. 2) while iteratively processing bit segments. However, when internal state 230 includes bits that resulted from a packet's last bit segment, feedback latches 595 sends output 0 550 to bucket selector 125 as bit 0 of a final hash value (final hash value 270 shown in FIG. 2). For example, a control signal may indicate to feedback latches 595 as to when the last bit segment is being processed.

Likewise, ORD logic block 1 560 generates output 1 570 from internal state 230's bits $X_1$, $X_{i+1}$, $X_{j+1}$, and $X_{k+1}$. ORD logic block m 580, which computes output m 590 using bit location 538 (last bit), may also receive preset input values (e.g., "0"), such as from substitution logic, because the offset locations exceed the maximum bits m. Other ORD logic blocks may also receive preset values from the substitution logic when one or more of their corresponding input bit locations are not between a minimum bit count value (e.g., bit 0) and a maximum bit count value included in internal state 230 (see FIG. 9 and corresponding text for further details). For simplicity, FIG. 5 does not show ORD logic blocks to process bits 2 through m−1.

FIG. 5 shows a one-to-one relationship between the number of ORD logic blocks 540-580 and the number of bit locations 500-538. As those skilled in the art can appreciate, less or more ORD logic blocks may be utilized based upon silicon space (reuse ORD logic blocks) or increasing hash value robustness by adding multiple mixing stages (see FIG. 6 and corresponding text for further details).

Figure 6:
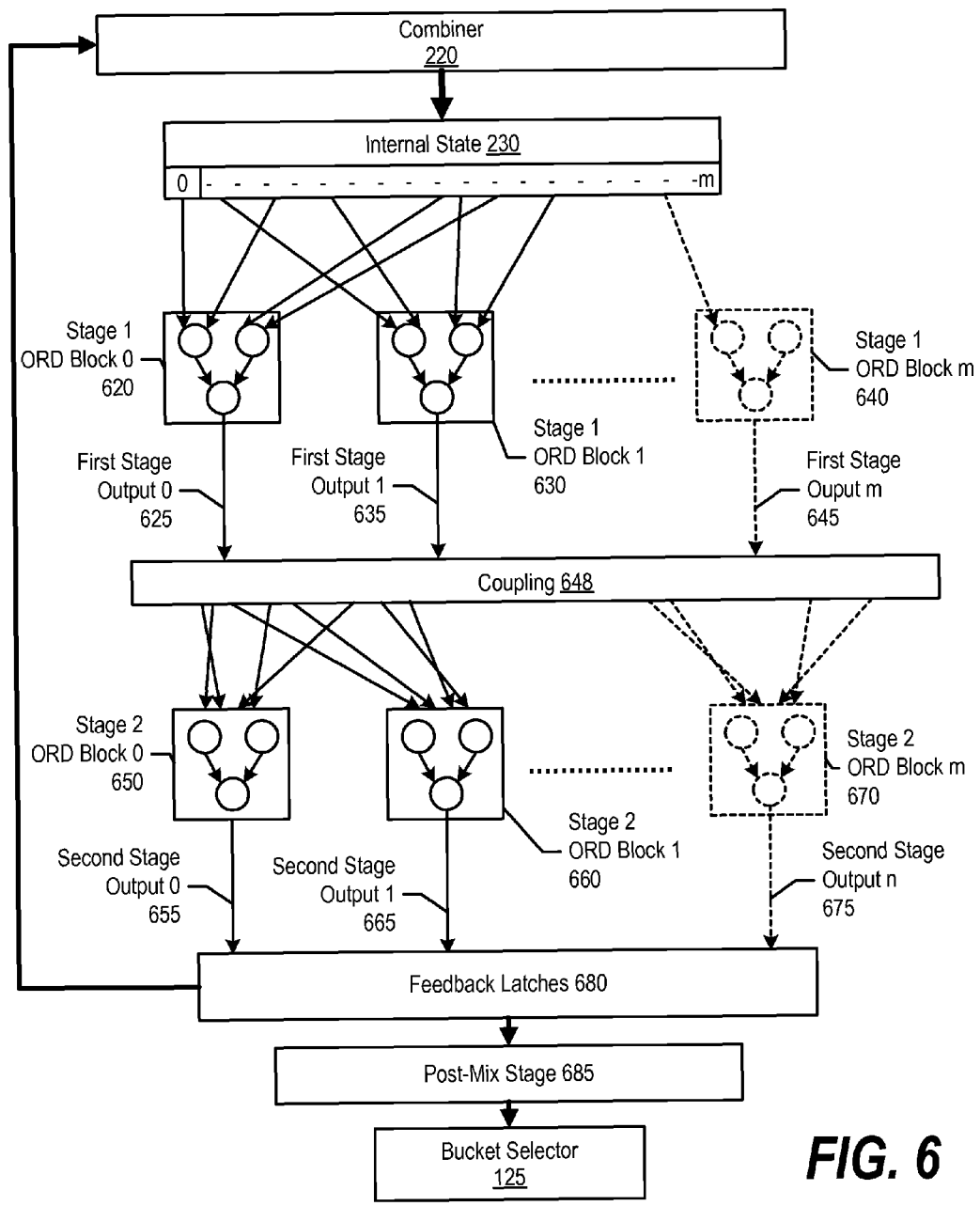
FIG. 6 is a diagram example showing multiple stages of ORD logic blocks that are utilized as a mixing function.

FIG. 6 is a diagram example showing multiple stages of ORD logic blocks that are utilized for a mixing function. Situations may exist when a mixing function requires multiple mixing stages to increase robustness, such as when the number of input bits is small or a large portion of the bits are hashed in parallel. FIG. 6 shows a first mixing stage comprising ORD logic blocks 620-640 and a second mixing stage comprising ORD logic blocks 650-670. In one embodiment, the first mixing stage performs a shift left operation and the second mixing stage performs a shift right operation.

Internal state 230 receives input bits from combiner 220 and provides the input bits to ORD logic blocks 620-640, such as that discussed in FIG. 5. ORD logic blocks 620-640 comprise a first mixing stage, which receives bits from internal state 230 and generates first stage output values 625-645, which are fed to ORD logic blocks 650-670 via coupling 648. Coupling 648 may include signal lines to couple the first mixing stage to the second mixing stage or, coupling 648 may be a temporary storage area that the first mixing stage stores data and the second mixing stage retrieves the data. In one embodiment, coupling 648 is configured to shift data in a direction opposite that of ORD logic blocks 620-640.

ORD logic blocks 650-670 comprise a second mixing stage (subsequent mixing stage), which generates second stage output values 655-675 (subsequent second nonlinear output values). Second stage output values 655-675 feed into feedback latches 680, which feeds back second stage output values 655-675 to combiner 220 while iteratively processing bit segments. However, when internal state 230 includes bits that resulted from a packet's last bit segment, feedback latches 680 sends second stage output values 655-675 to post mix stage 685. Post mix stage 685 includes mixing logic in order to further increase robustness of the hash value. For example, when processing multiple bit segments of a data packet, the first bit segments are iterated upon multiple times due to feedback latches 680 feeding values back to combiner. In this example, however, the last bit segment is not fed back to combiner 220 for iteration. By having post-mixing stage 685 in place, bits included in the last bit segment may be iterated upon more than once, thus increasing robustness. Post-mix stage 685 then feeds output values to bucket selector 125 as the packet's corresponding final hash value (final hash value 270).

Figure 7:
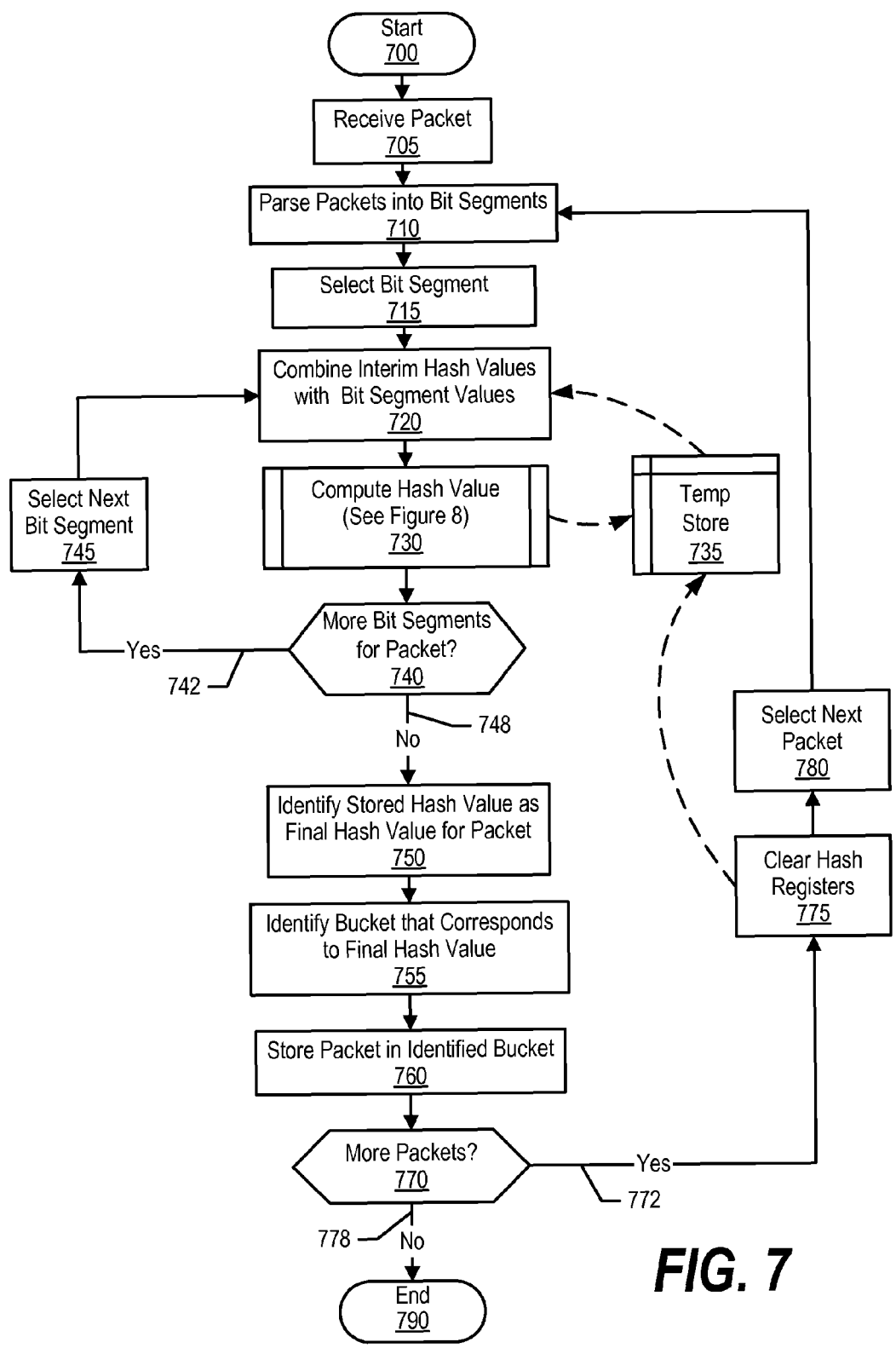
FIG. 7 is a high level flowchart example showing steps taken in generating a hash value for a data packet.
Figure 8:
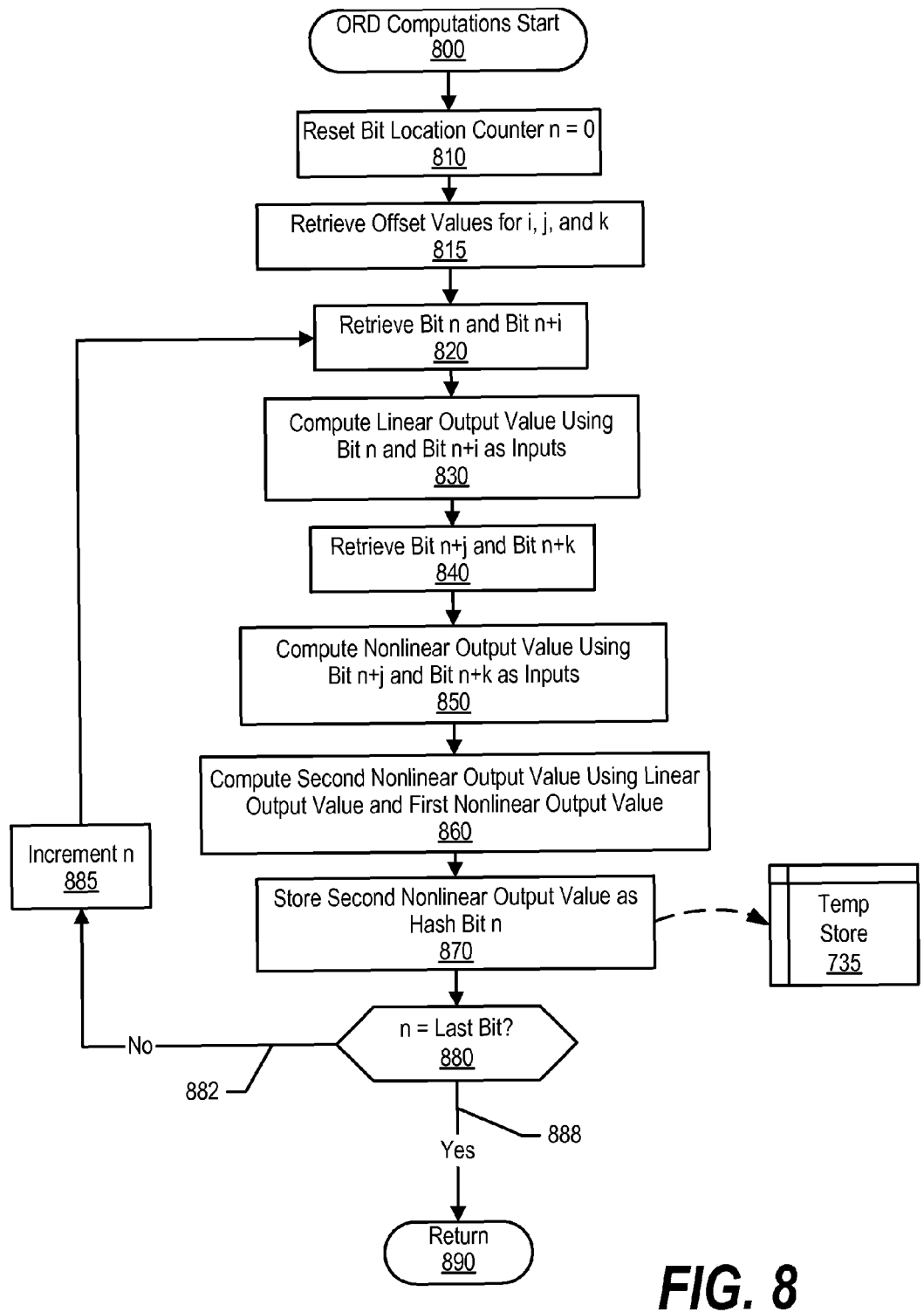
FIG. 8 is a flowchart example showing steps taken in computing a hash value for a bit segment.

FIG. 7 is a high level flowchart example showing steps taken in generating a hash value for a data packet. Embodiments may exist that require a software-based approach for generating strict avalanche criterion hash values. FIGS. 7 and 8 include an example of steps for implementing such embodiments. As those skilled in the art can appreciate, a combined hardware/software-based embodiment is possible by executing some steps in software and other steps in hardware.

Processing commences at 700, whereupon processing receives a data packet at step 705, such as an incoming network traffic data packet. At step 710, processing parses the data packet into bit segments. For example, assuming the data packet is 1024 bits in length, processing may parse the data packet into four 256 bit segments. Next, processing selects the first bit segment at step 715, and combines interim hash values stored in temp store 735 with the bit segment values (step 720). During the first bit segment's computations, the interim hash values may be reset to zero. Temp store 735 may be stored on a volatile or nonvolatile storage area, such as computer memory, a computer hard drive, or registers in a hardware configuration.

Processing computes a hash value using the combined bits and stores the interim hash value in temp store 735 (predefined process block 730, see FIG. 8 and corresponding text for further details).

A determination is made as to whether there are more bit segments to process (decision 740). If there are more bit segments to process, decision 740 branches to "Yes" branch 742, which loops back to select (step 745) and process the next bit segment by combining the next bit segment with the recently stored interim hash value (step 720). This looping continues until there are no more bit segments to process, at which point decision 740 branches to "No" branch 748.

At step 750, processing identifies the resultant hash value included in temp store 735 as a "final hash value" for the data packet and, at step 755, processing identifies a "bucket" to associate with the final hash value. For example, if the hash value is "0x3F9E," processing identifies a bucket that supports hash values 0x0000-0x4000. Processing, at step 760, stores the packet in the identified bucket.

A determination is made as to whether there are more incoming packets for which to generate a hash value (decision 770). If there are more incoming packets, decision 770 branches to "Yes" branch 772, whereupon processing clears storage locations (hash values) in temporary store 735 (step 775) and selects the next incoming packet at step 780 to process. This looping continues until there are no more incoming packets, at which point decision 770 branches to "No" branch 778 whereupon processing ends at 790.

FIG. 8 is a flowchart example showing steps taken in computing a hash value for a bit segment. Interim hash values are combined with subsequent bit segments during an iteration process, and the last interim hash value is used as a final hash value for a data packet (see FIG. 2 and corresponding text for further details).

Processing commences at 800, whereupon processing resets a bit location counter "n" to zero (step 810). The bit location counter tracks which bit to process in a bit segment (e.g., starts at the "0" bit location). At step 815, processing retrieves offset values for i, j, and k. Each of the offset values are added to n to derive offset bit locations. For example, if i=3, j=5, and k=7, when n=0, processing retrieves bits from bit locations 0, 3, 5, and 7 (see FIG. 9 and corresponding text for further details).

At step 820, processing retrieves bits from the bit segment at locations n and n+i and, at step 830, processing uses an exclusive-OR (XOR) function (e.g., XOR operation) to compute a linear output value using the retrieved bits.

Next, at step 840, processing retrieves bits from bit locations n+j and n+k and, at step 850, processing uses an OR function (e.g., OR operation) to compute a first nonlinear output value using the retrieved bits. The first nonlinear output value is nonlinear in nature because a one-to-one relationship does not exist between changes in input values compared with changes in output values (see FIG. 4 and corresponding text for further details). Processing then computes a second nonlinear output value using the linear output value and the first nonlinear output value as inputs to an XOR function (step 860). At step 870, processing stores the second nonlinear output value as hash value bit "n" (e.g., bit 0) in temp store 735.

A determination is made as to whether processing has computed hash values for each bit included in the bit segment (decision 880). If more bits require processing, decision 880 branches to "No" branch 882, whereupon processing increments n at step 885. As a result, when processing retrieves bits for n, n+i, n+j, and n+k, the bit locations are incremented by one. Using the example described above, when n increments to 1, processing retrieves bits from bit locations 1, 4, 6, and 9. In one embodiment, when a bit location value exceeds the bit segment's last bit location "m," processing may use a default value such as "0." For example, when a bit segment includes bits 0-15, when n+k=16, processing uses "0" as a bit value for $X_{n+k}$ (see FIG. 9 and corresponding text for further details).

Processing proceeds to compute hash values for each bit location, after which decision 880 branches to "Yes" branch 888, whereupon processing returns at 890.

FIG. 9 is a table showing an example of bit locations for which to retrieve input values from a bit segment. An ORD logic block utilizes four inputs to compute an output. One of the bit locations is a bit location "n" and the other bit locations are offset bit locations n+i, n+j, and n+k. Offset values i, j, and k may have properties such as prime numbers or other properties that improve hash robustness or allow simpler software/hardware implementations.

Table 900 includes columns 910-950 and rows 952-982. Column 910 includes values for n and columns 920-950 include bit locations (or preset values) for receiving bit values based upon the value of n. The example shown in FIG. 9 has i, j, and k equaling 3, 5, and 8, respectively. As such, row 952 shows that when n=0, the ORD logic block receives bits from bit locations 0, 3, 5, and 8. Row 964 shows that when n=6, the ORD logic block receives bits from bit locations 6, 9 (6+3), 11 (6+5), and 14 (6+8).

In one embodiment, when an offset bit location exceeds a bit segment's last bit location, a preset value may be substituted as an input (e.g., "0"). Table 900 shows this bit substitution in row 968 when a bit segment is limited to bit locations 0-15. Row 968 shows that when n=8, thus n+k=16, a preset value is substituted for the input n+k value. Likewise in row 974, when n=11, thus n+j=16, a preset bit value is substituted for the input n+j value. Similarly, if any of the values i, j, or k have negative values, when an offset bit location is before a bit segment's first bit location, a preset value may be substituted as an input (e.g. "0").

Figure 10:
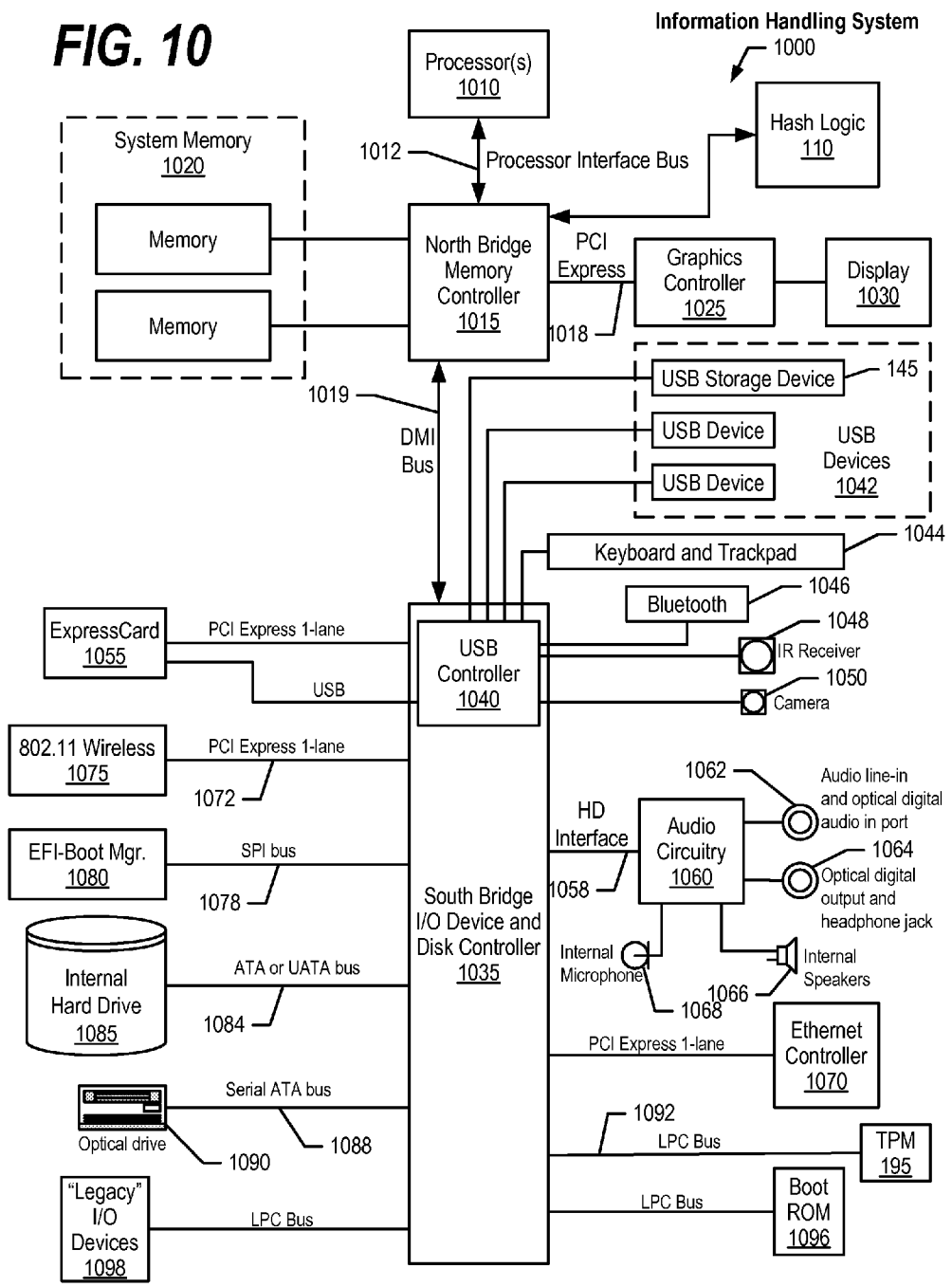
FIG. 10 is a block diagram example of a data processing system for which the methods described herein may be implemented.

FIG. 10 illustrates information handling system 1000, which is a simplified example of a computer system capable of performing the computing operations described herein. Information handling system 1000 (e.g., information handling system 100 shown in FIG. 1) includes one or more processors 1010 coupled to processor interface bus 1012. Processor interface bus 1012 couples processors 1010 to Northbridge 1015, which is also known as the Memory Controller Hub (MCH). Northbridge 1015 couples to system memory 1020 and provides a means for processor(s) 1010 to access the system memory. Graphics controller 1025 also couples to Northbridge 1015. In one embodiment, PCI Express bus 1018 couples Northbridge 1015 to graphics controller 1025. Graphics controller 1025 couples to display device 1030, such as a computer monitor. Hash logic 110 couples to Northbridge to receive packets and provide hash values. Hash logic 110 may be a hardware-based implementation or a software-based implementation as discussed in this disclosure. In one embodiment, hash logic 110 may reside within processor 1010. In another embodiment, the functionality of hash logic 110 described herein may be written in software code and executed by processor 1010.

Northbridge 1015 and Southbridge 1035 connect to each other using bus 1019. In one embodiment, the bus is a Direct Media Interface (DMI) bus that transfers data at high speeds in each direction between Northbridge 1015 and Southbridge 1035. In another embodiment, a Peripheral Component Interconnect (PCI) bus couples the Northbridge and the Southbridge. Southbridge 1035, also known as the I/O Controller Hub (ICH) is a chip that generally implements capabilities that operate at slower speeds than the capabilities provided by the Northbridge. Southbridge 1035 typically provides various busses used to connect various components. These busses include, for example, PCI and PCI Express busses, an ISA bus, a System Management Bus (SMBus or SMB), and/or a Low Pin Count (LPC) bus. The LPC bus often couples low-bandwidth devices, such as boot ROM 1096 and "legacy" I/O devices (using a "super I/O" chip). The "legacy" I/O devices (1098) can include, for example, serial and parallel ports, keyboard, mouse, and/or a floppy disk controller. The LPC bus also couples Southbridge 1035 to Trusted Platform Module (TPM) 1095. Other components often included in Southbridge 1035 include a Direct Memory Access (DMA) controller, a Programmable Interrupt Controller (PIC), and a storage device controller, which couples Southbridge 1035 to nonvolatile storage device 1085, such as a hard disk drive, using bus 1084.

ExpressCard 1055 is a slot that couples hot-pluggable devices to the information handling system. ExpressCard 1055 supports both PCI Express and USB connectivity as it couples to Southbridge 1035 using both the Universal Serial Bus (USB) the PCI Express bus. Southbridge 1035 includes USB Controller 1040 that provides USB connectivity to devices that connect to the USB. These devices include webcam (camera) 1050, infrared (IR) receiver 1048, keyboard and trackpad 1044, and Bluetooth device 1046, which provides for wireless personal area networks (PANs). USB Controller 1040 also provides USB connectivity to other miscellaneous USB connected devices 1042, such as a mouse, removable nonvolatile storage device 1045, modems, network cards, ISDN connectors, fax, printers, USB hubs, and many other types of USB connected devices. While removable nonvolatile storage device 1045 is shown as a USB-connected device, removable nonvolatile storage device 1045 could be connected using a different interface, such as a Firewire interface, etcetera.

Wireless Local Area Network (LAN) device 1075 couples to Southbridge 1035 via the PCI or PCI Express bus 1072. LAN device 1075 typically implements one of the IEEE 802.11 standards of over-the-air modulation techniques that all use the same protocol to wireless communicate between information handling system 1000 and another computer system or device. Optical storage device 1090 couples to Southbridge 1035 using Serial ATA (SATA) bus 1088. Serial ATA adapters and devices communicate over a high-speed serial link. The Serial ATA bus also couples Southbridge 1035 to other forms of storage devices, such as hard disk drives. Audio circuitry 1060, such as a sound card, couples to Southbridge 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 couples to Southbridge 1035 using a bus, such as the PCI or PCI Express bus. Ethernet controller 1070 couples information handling system 1000 to a computer network, such as a Local Area Network (LAN), the Internet, and other public and private computer networks.

While FIG. 10 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A system comprising:
 a logic block that receives a plurality of bit values, the plurality of bit values including a first bit value, a second bit value, a third bit value, and a fourth bit value, the logic block further comprising:
  a first exclusive-OR function that receives the first bit value and the second bit value, and generates a linear output value based upon exclusive disjunction between the first bit value and the second bit value;
  an OR function that receives the third bit value and the fourth bit value, and generates a first nonlinear output value based upon logical disjunction between the third bit value and the fourth bit value; and
  a second exclusive-OR function that receives the linear output value and the first nonlinear output value, and generates a second nonlinear output value based upon exclusive disjunction between the linear output value and the first nonlinear output value, wherein the second nonlinear output value is utilized to represent the plurality of bit values.

2. The system of claim 1 further comprising:
 parsing logic to parse data into a plurality of bit segments;
 a bit segment input stage that stores one of the plurality of bit segments, the stored bit segment including the plurality of bit values; and
 post-mixing logic that generates a hash value for the data based upon the second nonlinear output value.

3. The system of claim 2 wherein the bit segment input stage stores a subsequent bit segment from the plurality of bit segments, the system further comprising:
 combination logic for combining the second nonlinear output value with a bit included in the subsequent bit segment.

4. The system of claim 2 further comprising:
 feedback logic for providing the second nonlinear output value to the post-mixing logic when the subsequent bit segment is a last bit segment of the plurality of bit segments, and for providing the second nonlinear output value to the combination logic when the subsequent bit segment is not the last bit segment of the plurality bit segments.

5. The system of claim 2 further comprising:
 a plurality of staging buckets, wherein each of the plurality of staging buckets are different temporary storage areas; and
 bucket selection logic that uses the hash value to select one of the plurality of staging buckets and stores the data in the selected staging bucket.

6. The system of claim 2 further comprising:
 a subsequent logic block comprising a subsequent first exclusive-OR function, a subsequent OR function, and a subsequent second exclusive-OR function, the subsequent logic block receiving the second nonlinear output value and producing a subsequent second nonlinear output value that is utilized by the post-mixing logic to generate the hash value.

7. The system of claim 6 wherein the logic block shifts the plurality of bit values in a first direction and the subsequent logic block shifts the plurality of bit values in a second direction that is different than the first direction.

8. The system of claim 1 wherein the logic block produces the second nonlinear value within one clock cycle after receiving the plurality of bit values.

9. A system comprising:
 one or more processing units;
 a memory accessible by at least one of the processing units;
 a nonvolatile storage area accessible by at least one of the processors; and
 a logic block that receives a plurality of bit values, the plurality of bit values including a first bit value, a second bit value, a third bit value, and a fourth bit value, the logic block further comprising:
  a first exclusive-OR function that receives the first bit value and the second bit value, and generates a linear output value based upon exclusive disjunction between the first bit value and the second bit value;
  an OR function that receives the third bit value and the fourth bit value, and generates a first nonlinear output value based upon logical disjunction between the third bit value and the fourth bit value; and
  a second exclusive-OR function that receives the linear output value and the first nonlinear output value, and generates a second nonlinear output value based upon exclusive disjunction between the linear output value and the first nonlinear output value, wherein the second nonlinear output value is utilized to represent the plurality of bit values.

10. The system of claim 9 further comprising:
 parsing logic to parse data into a plurality of bit segments;
 a bit segment input stage that stores one of the plurality of bit segments, wherein the stored bit segment includes the plurality of bit values; and
 post-mixing logic that generates a hash value for the data based upon the second nonlinear output value.

11. The system of claim 10 further comprising:
 wherein the bit segment input stage stores a subsequent bit segment from the plurality of bit segments; and
 combination logic for combining the second nonlinear output value with a bit included in the subsequent bit segment.

12. The system of claim 10 further comprising:
 feedback logic for providing the second nonlinear output value to the post-mixing logic when the subsequent bit segment is a last bit segment of the plurality of bit segments, and for providing the second nonlinear output value to the combination logic when the subsequent bit segment is not the last bit segment of the plurality bit segments.

13. The system of claim 10 further comprising:
a plurality of staging buckets, wherein each of the plurality of staging buckets are different temporary storage areas; and
bucket selection logic that uses the hash value to select one of the plurality of staging buckets and stores the data in the selected staging bucket.

14. The system of claim 10 further comprising:
a subsequent logic block comprising a subsequent first exclusive-OR function, a subsequent OR function, and a subsequent second exclusive-OR function, the subsequent logic block receiving the second nonlinear output value and producing a subsequent second nonlinear output value that is utilized by the post-mixing logic to generate the hash value.

15. The system of claim 14 wherein the logic block shifts the plurality of bit values in a first direction and the subsequent logic block shifts the plurality of bit values in a second direction that is different than the first direction.

16. The system of claim 9 wherein the logic block produces the second nonlinear value within one clock cycle after receiving the plurality of bit values.

17. A method comprising:
parsing data into a plurality of bit segments;
selecting one of the plurality of bit segments, wherein the selected bit segment includes a first bit value, a second bit value, a third bit value, and a fourth bit value;
generating a linear output value using an information handling system based upon exclusive disjunction between the first bit value and the second bit value;
generating a first nonlinear output value using the information handling system based upon logical disjunction between the third bit value and the fourth bit value;
generating a second nonlinear output value using the information handling system based upon exclusive disjunction between the linear output value and the first nonlinear output value; and
generating a hash value for the data using the information handling system based upon the second nonlinear output value.

18. The method of claim 17 further comprising:
selecting one of a plurality of staging buckets that correspond to the hash value; and
storing the data in the selected staging bucket.

19. The method of claim 17 further comprising:
selecting a subsequent bit segment from the plurality of bit segments; and
combining the second nonlinear output value with a bit included in the subsequent bit segment.

20. The method of claim 17 further comprising:
generating a subsequent second nonlinear output value from the second nonlinear output value, and using the subsequent second nonlinear output value to generate the hash value.

* * * * *